US012192441B2

(12) United States Patent
Kalva et al.

(10) Patent No.: US 12,192,441 B2
(45) Date of Patent: *Jan. 7, 2025

(54) METHODS AND SYSTEMS OF VIDEO CODING USING REFERENCE REGIONS (71) Applicant: OP Solutions LLC, Amherst, MA (US)

(72) Inventors: Hari Kalva, Boca Raton, FL (US);
Borivoje Furht, Boca Raton, FL (US);
Velibor Adzic, Boca Raton, FL (US)

(73) Assignee: OP Solutions, LLC, Amherst, MA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/751,754

(22) Filed: May 24, 2022

(65) Prior Publication Data
US 2023/0388483 A1 Nov. 30, 2023
US 2024/0406373 A9 Dec. 5, 2024

Related U.S. Application Data (63) Continuation of application No. 17/229,957, filed on Apr. 14, 2021, now Pat. No. 11,356,660, and a continuation-in-part of application No. 17/193,617, filed on Mar. 5, 2021, now Pat. No. 11,438,603, which is a continuation of application No. 17/091,052, filed on Nov. 6, 2020, now Pat. No. 11,006,132.

(60) Provisional application No. 63/009,978, filed on Apr. 14, 2020, provisional application No. 62/932,597, filed on Nov. 8, 2019.

(51) Int. Cl.
H04N 19/105 (2014.01)
H04N 19/139 (2014.01)
H04N 19/172 (2014.01)
H04N 19/80 (2014.01)

(52) U.S. Cl.
CPC ......... *H04N 19/105* (2014.11); *H04N 19/139* (2014.11); *H04N 19/172* (2014.11); *H04N 19/80* (2014.11)

(58) Field of Classification Search
CPC .. H04N 19/105; H04N 19/139; H04N 19/172; H04N 19/70; H04N 19/80
See application file for complete search history.

(56) References Cited

U.S. PATENT DOCUMENTS

2017/0332097 A1* 11/2017 Lee ................. H04N 19/80

* cited by examiner

*Primary Examiner* — Anner N Holder
(74) *Attorney, Agent, or Firm* — OP Solutions IP Department; Paul Ackerman (57) ABSTRACT A decoder includes circuitry configured to receive a bitstream, identify a first frame, locate a first independent reference region within the first frame, extract the first independent reference region from the first frame, decode a second frame using the first independent reference region as a reference for the second frame.

11 Claims, 9 Drawing Sheets

METHODS AND SYSTEMS OF VIDEO CODING USING REFERENCE REGIONS

CROSS-REFERENCE TO RELATED APPLICATIONS

This application is a continuation of U.S. patent application Ser. No. 17/229,957, filed on Apr. 14, 2021 and titled "METHODS AND SYSTEMS OF VIDEO CODING USING REFERENCE REGIONS," which claims the benefit of priority of U.S. Provisional Patent Application Ser. No. 63/009,978, filed on Apr. 14, 2020, and titled "METHODS AND SYSTEMS OF VIDEO CODING USING REFERENCE REGIONS," U.S. Non-Provisional patent application Ser. No. 17/193,617, filed on Mar. 5, 2021, and titled "METHODS AND SYSTEMS FOR ADAPTIVE CROPPING," which is a continuation application of U.S. Non-Provisional patent application Ser. No. 17/091,052, filed on 6 Nov. 2020, and titled "METHODS AND SYSTEMS FOR ADAPTVE CROPPING," which claims priority to U.S. Provisional Patent Application Ser. No. 62/932,597, filed on 8 Nov. 2019, and titled "METHODS AND SYSTEMS FOR ADAPTIVE CROPPING," U.S. Non-Provisional patent application Ser. No. 16/948,115, filed on 3 Sep. 2020, and titled "ADAPTIVE RESOLUTION MANAGEMENT PREDICTION RESCALING," which claims priority to International Application No. PCT/US20/45157, filed on 6 Aug. 2020, and titled "ADAPTIVE RESOLUTION MANAGEMENT PREDICTION RESCALING," which in turn claims priority to U.S. Provisional Patent Application Ser. No. 62/883,454, filed on 6 Aug. 2019, and titled "ADAPTIVE RESOLUTION MANAGEMENT PREDICTION RESCALING;" this application further claims the benefit of U.S. Non-Provisional patent application Ser. No. 16/948,120, filed on 3 Sep. 2020, and titled ADAPTIVE RESOLUTION MANAGEMENT USING SUB-FRAMES, which claims priority to International Application No. PCT/US20/45218, filed on Aug. 6, 2020 and entitled "ADAPTIVE RESOLUTION MANAGEMENT USING SUB-FRAMES," which in turn claims the benefit of priority of U.S. Provisional Patent Application Ser. No. 62/883,480, filed on Aug. 6, 2019, and titled "ADAPTIVE RESOLUTION MANAGEMENT USING SUB-FRAMES," all of which are incorporated by reference herein in their entirety.

FIELD OF THE INVENTION

The present invention generally relates to the field of video compression. In particular, the present invention is directed to methods and systems of video coding using reference regions.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, ease of editing, random access, end-to-end delay (e.g., latency), and the like.

Motion compensation can include an approach to predict a video frame or a portion thereof given a reference frame, such as previous and/or future frames, by accounting for motion of the camera and/or objects in the video. It can be employed in the encoding and decoding of video data for video compression, for example in the encoding and decoding using the Motion Picture Experts Group (MPEG)'s advanced video coding (AVC) standard (also referred to as H.264). Motion compensation can describe a picture in terms of the transformation of a reference picture to the current picture. The reference picture can be previous in time when compared to the current picture, from the future when compared to the current picture. When images can be accurately synthesized from previously transmitted and/or stored images, compression efficiency can be improved.

SUMMARY OF THE DISCLOSURE

In an aspect, a decoder includes circuitry configured to receive a coded video bitstream, the coded video stream including a coded reference picture and a coded current picture having a first size, decode the reference picture, identify from the bitstream a sub-region of the reference picture, the sub-region having a second size, wherein the second size is different from the first size, rescale the sub-region to a third size, wherein the third size is equal to the first size, to form a rescaled reference picture, and decode the current picture using the rescaled reference picture.

In another aspect, a decoder includes circuitry configured to receive a coded video bitstream including a coded first reference picture and a coded current picture, decode the reference picture, identify from the bit stream a first sub-region of the reference picture, transform the first sub-region to form a second reference picture, and decode the current picture using the second reference picture.

In another aspect, a method of video coding using reference regions includes receiving, by a decoder, a coded video bitstream, the coded video bitstream including a coded reference picture and a coded current picture having a first size, decoding, by the decoder, the reference picture, identifying, by the decoder and from the bitstream, a sub-region of the reference picture, the sub-region having a second size, wherein the second size is different from the first size, rescaling, by the decoder, the sub-region to a third size, wherein the third size is equal to the first size, to form a rescaled reference picture, and decoding, by the decoder, the current picture using the rescaled reference picture.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention.

However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In traditional video coding systems, video sequence is divided into groups-of-pictures (GOP). Each GOP is self-contained in the sense of temporal and spatial prediction. Usually, first picture in the group is used as a reference picture for the subsequent pictures. Temporal and spatial relationships between the pictures allow for the very efficient compression using predictive coding.

Figure 1:
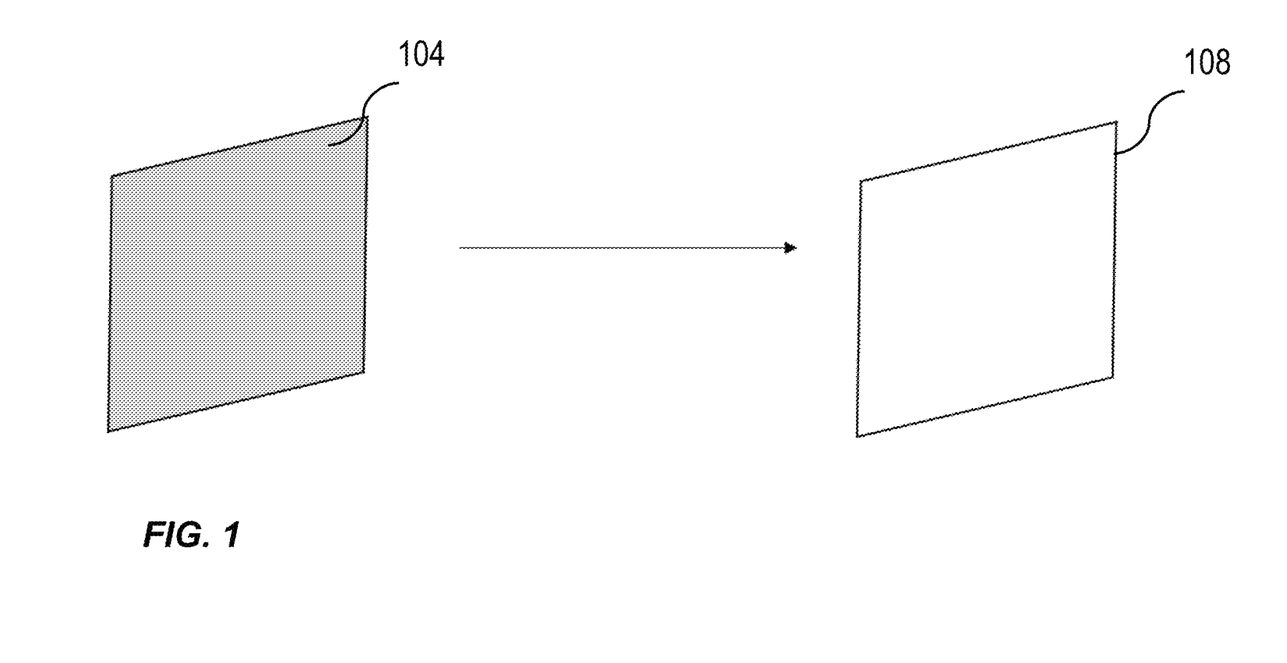
FIG. 1 is a block diagram illustrating an embodiment decoding using a reference frame.

Referring now to FIG. 1, each GOP may include a reference frame 104 or intra-frame (I-frame) used as a reference, and information usable to predict other frames 108 from the reference; information usable for prediction may include, without limitation, global and/or local motion vectors and/or transformations as well as a residual as described in further. Transmission of a reference frame 104 or I-frame may represent a substantial portion of bandwidth used in transmission of a GOP.

In some embodiments, transmission bandwidth may be reduced and/or decoding and/or encoding efficiency improved using a long-term reference (LTR) frame. As used in this disclosure, an LTR frame is a frame and/or picture used to create predicted frames and/or pictures in one or more groups of pictures (GOP), but which may not itself be displayed in a video picture. A frame marked as an LTR frame in a video bitstream may be available for use as a reference until it is explicitly removed by bitstream signaling. LTR frames may improve prediction and compression efficiency in scenes that have static background over an extended period (e.g., background in a video conference or video of parking lot surveillance).

Current standards such as H.264 and H.265 allow updating of similar frames, such as LTR frames, by signaling a newly decoded frame to be saved and made available as a reference frame 104. Such updates are signaled by the encoder and an entire frame is updated. But updating the entire frame can be costly, particularly where only a small portion of the static background has changed.

Figure 2:
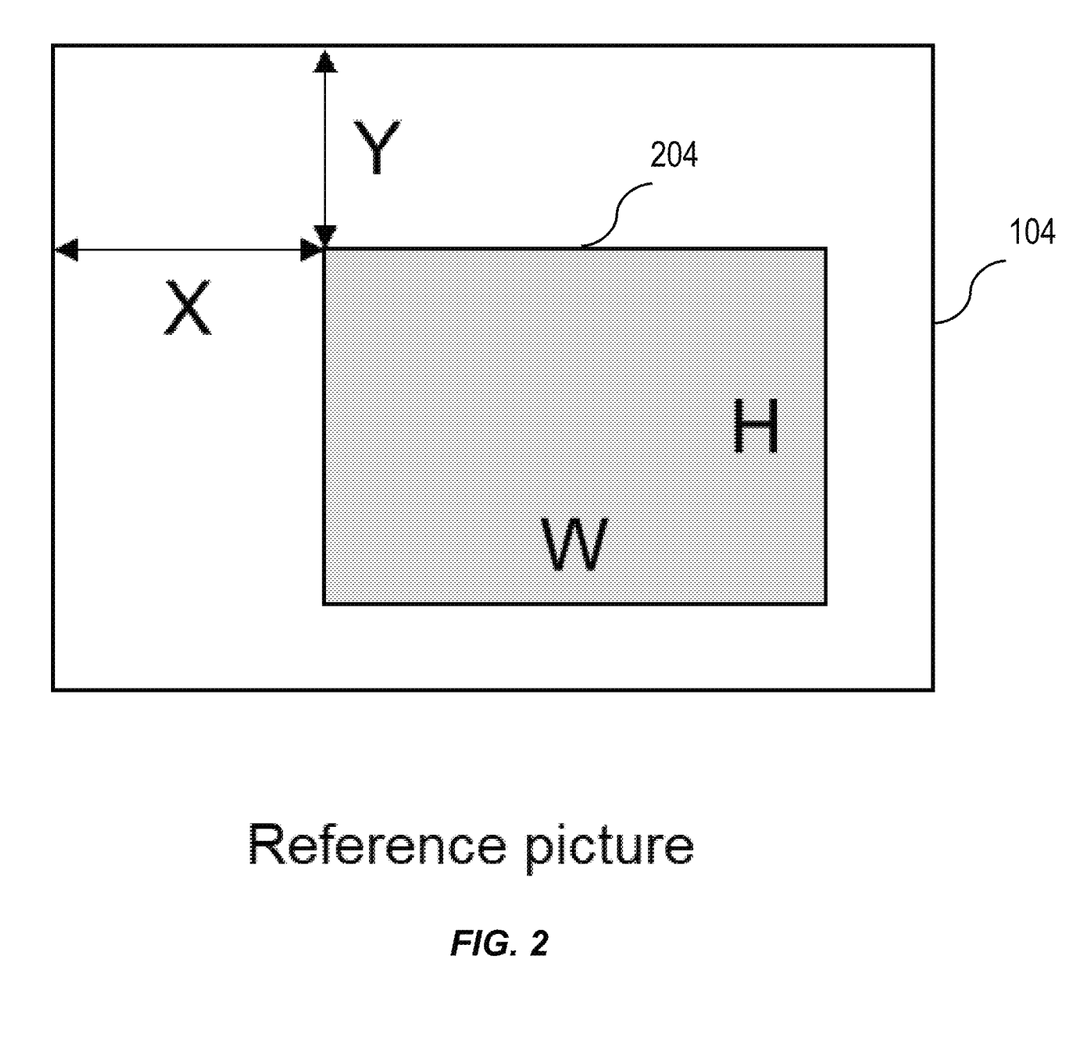
FIG. 2 is an illustration of an exemplary embodiment of a reference frame with an independent reference region.

Referring now to FIG. 2, embodiments disclosed herein improve efficiency and flexibility of above-described prediction processes by performing a prediction using at least a reference region of a reference frame 104 as a reference for a current frame, where the reference region or "sub-region" has a size, which may include an area, defined for instance in pixels, that is smaller than an area of the reference frame 104. In contrast to current coding standards, where predicted frames are generated from entire reference frames 104, the above-described approach may enable a decoder to perform decoding operations more efficiently and with greater variation. At least a sub-region 204 may be used for any number of frames, at any position within GOP, thus removing the requirement for I-frame re-coding and/or retransmission.

Continuing to refer to FIG. 2, an exemplary embodiment of a reference frame 104 with a sub-region 204 representing a cropped portion of the video view is illustrated. Sub-region 204 may be identified, for instance by a decoder as described in further detail below, within reference frame 104. Sub-region 204 may be used as a reference region in a manner analogous to the use of a cropped reference frame 104, without requiring a cropped reference frame 104 to be transmitted separately.

As a non-limiting and illustrative example, and still referring to FIG. 2, reference frame 104 may have a first resolution defined by a first width D1 and a first height D2, where D1 and D2 may be, without limitation, numbers of units of measurement such as pixels and/or fractions of pixels; an area of reference frame 104 may be defined as an area of a rectangular array of units of measurement D1 and D2, defined as a resolution D1×D2. Sub-region 204 may have a width W and a height H, defining an area or resolution of W×H. Sub-region 204 may define a sub-picture 204 within Reference picture that has same or smaller dimensions, where "smaller dimensions" signify that at least one of W and H is smaller than a corresponding dimension of reference frame 104; in other words, either W is less than D1 or H is less than D2. As a result, resolution or area W×H may be less than resolution or area D1×D2. Sub-region 204 may be defined by a quadruple (X,Y,W,H), where X,Y is the coordinate of the top-left corner of the sub-region 204 relative to the top-left corner of the Reference picture, and W,H are width and height of the sub-region 204 expressed in the units of measurement. It should be noted that alternative quadruples may be selected to define sub-region 204, such as without limitation coordinates of an alternative corner of sub-region 204, a set of two diagonally opposed vertices, and/or vectors to any defined points. Data defining sub-region 204 may be static over a GOP; for instance, a quadruple (X,Y,W,H) or equivalent may be static over a GOP. Alternatively, or additionally, data defining sub-region 204 may be dynamic. For example, and without limitation, sub-region 204 change between subsequent pictures of GOP to follow movement of an object and/or person of interest in a video picture; this may be coded similarly to motion vectors and/or transformations used in video coding generally. Data may be provided defining sub-region 204 for each picture of group of pictures; this may be accomplished, without limitation, by a set of data defining sub-region 204, for instance as described above, for each picture of a group of pictures, by a set of data defining a sub-region 204 in one picture and further data describing movement of sub-region 204 from one picture to previous or subsequent picture, or the like. Data defining sub-region 204 may be specified and/or signaled in a sequence parameter set (SPS); updated data defining sub-region 204 may be provided in a picture parameter set (PPS) for one or more selected pictures and/or frames of a GOP.

With continued reference to FIG. 2, a decoder may be receiving, be about to receive, or have already received a reference frame 104 at resolution D1×D2 and may select a sub-region 204 using a quadruple as described above. In some implementations, encoder may signal a geometric characteristic of sub-region 204 to the decoder using extra bits in a bitstream. Signaling bits may indicate a reference frame 104 index and/or an index identifying a GOP, within a buffer, such as an LTR buffer and/or reference buffer as described in further detail below, identifying picture indices at a decoder, and a sub-region 204 quadruple. Decoder may then extract sub-region 204 as an independent reference region. Subsequent frames may be predicted from extracted independent reference region. Where data defining sub-region 204 is dynamic as described above, subsequent frames may further be predicted using such data and reference region; advantageously, a single reference region may be used for a sub-region 204 that moves relative to a picture, without requiring retransmission of the reference region. A size and/or location of a sub-region 204, reference frame 104, or the like may alternatively or additionally be characterized using parameters, which may be signaled in bitstream, such as a height offset, a height, a length offset and/or a length.

Still referring to FIG. 2, a sub-region 204 may be signaled using at least a vertical offset and at least a horizontal offset; for instance, and without limitation, a quadruple as described above may specify a vertical offset from a top edge of frame, a vertical offset from a bottom edge of frame, a horizontal offset from a left edge of frame, and a horizontal offset from a right edge of frame, where offsets may be measured in pixels of a frame either prior to or after rescaling as described in further detail below. As a non-limiting example, at least a vertical offset may include an sps_conf_win_top_offset and an sps_conf_win_bottom offset, which may be signaled in an SPS and may identify, respectively, a vertical offset from a top edge of frame and a vertical offset from bottom edge of frame. As a further non-limiting example, at least a horizontal offset may include an sps_conf_win_left_offset and an sps_conf_win_right_offset, which may be signaled in an SPS and may identify, respectively, a horizontal offset from a left edge of frame and a horizontal offset from a right edge of frame.

With continued reference to FIG. 2, a sub-region 204 may alternatively or additionally be identified by specification of one or more tiles or slices to be included in and/or excluded from the sub-region 204. Tile number and position within a frame may be signaled in a picture header. In an embodiment, signaling may be explicit; alternatively or additionally, PPS may signal tile rows, columns, row height, and/or column width, any or all of which may be combined and/or utilized by a decoder to determine tile count and/or number. For instance, and without limitation, a PPS parameter denoted as pps_num_exp_tile_columns_minus1, with 1 added to it, may specifie a number of explicitly provided tile column widths. As a further non-limiting example, a parameter pps_tile_column_width_minus1[i], with 1 added to it, may specify the width of the i-th tile column, for instance in units of coding tree blocks (CTBs) for i in the range of 0 to pps_num_exp_tile_columns_minus1, inclusive. A parameter pps_tile_row_height_minus1[i] plus 1, with 1 added to it, may specify the height of the i-th tile row, for instance in units of CTBs for i. Signaled parameters may alternatively or additionally specify numbers and/or dimensions of slices within one or more tiles. For instance, a parameter denoted pps_num_exp_slices_in_tile[i] may specify a number of explicitly provided slice heights for slices in a tile containing the i-th slice. A parameter denoted pps_slice_width_in_tiles_minus1[i], with 1 added to it, may specify a width of the i-th rectangular slice in units of tile columns. A parameter denoted pps_slice_height_in_tiles_minus1[i], with 1 added to it, may specify a height of the i-th rectangular slice in units of tile rows, for instance when pps_num_exp_slices_in_tile[i] is equal to 0. Persons skilled in the art, upon reviewing the entirety of this disclosure, will be aware of various alternative or additional ways in which tile and/or slice parameters may be signaled and/or determined in and/or from bitstream and/or header parameters, whether implicitly or explicitly.

Still referring to FIG. 2, where transformation of a sub-region 204 includes rescaling sub-region 204, width and height of smaller and/larger sub-region 204 may be obtained by multiplying a width and height of sub-region 204 by an arbitrary rescaling constant (Rc), also referred to as a scaling factor and/or constant, which may alternatively or additionally be referred to with a variable name such as RefPicScale. In case of smaller sub-regions 204, Rc may have a value between 0 and 1. In case of larger frames, Rc may have a value greater than 1; for instance, Rc may have a value between 1 and 4. Other values are possible. Rescaling constant may be different for one resolution dimension than another; for instance, a rescaling constant Rch may be used to rescale height, while another rescaling constant Rcw may be used to rescale width.

Still referring to FIG. 2, rescaling may be implemented as a mode. In some implementations, an encoder may signal to decoder which rescaling constant to use, for instance as a function of a picture parameter such as pps_pic_width_in_luma_samples parameter, a pps_scaling_win_right_offset parameter, and/or a pps_scaling_win_left_offset parameter. Signaling may be performed in a sequence parameter set (SPS) corresponding to a GOP containing current picture and/or in a picture parameter set (PPS) corresponding to current picture. For instance, and without limitation, encoder may signal rescaled parameters using fields such as a ppspic_width_in_luma_samples, pps_pic_height_in_luma_samples, pps_scaling_win_left_offset, pps_scaling_win_right_offset, pps_scaling_win_top_offset, pps_scaling_win_bottom_offset, and/or sps_num_subpics_minus1. A parameter such as pps_scaling_window_explicit_signalling_flag equal to 1 may specify that scaling window offset parameters are present in the PPS; pps_scaling_window_explicit_signalling_flag equal to 0 may indicate that the scaling window offset parameters are not present in the PPS. When sps_ref_pic_resampling_enabled_flag is equal to 0, a value of pps_scaling_window_explicit_signalling_flag may be equal to 0. pps_scaling_win_left_offset, pps_scaling_win_right_offset, pps_scaling_win_top_offset, and pps_scaling_win_bottom_offset may specify offsets that are applied to picture size for scaling ratio calculation. When not present, values of pps_scaling_win_left_offset, pps_scaling_win_right_offset, pps_scaling_win_top_offset, and pps_scaling_win_bottom_offset may be inferred to be equal to pps_conf_win_left_offset, pps_conf_win_right_offset, pps_conf_win_top_offset, and pps_conf_win_bottom_offset, respectively.

Further referring to FIG. 2, W and H parameters as described above may be represented, without limitation, using variables CurrPicScalWinWidthL and CurrPicScalWinHeightL, respectively; these variables may be derived from signaled parameters as described above using one or more mathematical relationships between the signaled parameters and the variables. For instance, and without limitation, CurrPicScalWinWidthL may be derived according to the following equation:

CurrPicScalWinWidth$L$=pps_pic_width_in_luma_samples−SubWidth$C$*(pps_scaling_win_right_offset+pps_scaling_win_left_offset)

As a further non-limiting example, CurrPicScalWinHeightL may be derived according to the following equation:

CurrPicScalWinWidth$L$=pps_pic_width_in_luma_samples−SubWidth$C$*(pps_scaling_win_right_offset+pps_scaling_win_left_offset)

rescaling operation may be executed on a block level of encoded frames and/or sub-regions 204. For example, a sub-region 204 to be used as a reference frame 104 may first be rescaled and subsequently prediction may be performed. Block prediction process may be performed on a scaled reference frame 104 (having a scaled resolution) rather than the original reference frame 104. Rescaling reference frame 104 and/or sub-region 204 may include rescaling according to any parameter signaled by an encoder as described above; for instance and without limitation, where a reference frame 104 to be used with current picture is signaled, such as via a reference to an index value associated with reference frame 104 or the like, the signaled reference frame 104 may be rescaled, prior to prediction, according to any method of rescaling described above. A rescaled reference frame 104 may be stored in memory and/or in a buffer, which may include without limitation a buffer identifying frames contained therein by indices, according to which frame retrieval may be performed; buffer may include a decoded picture buffer (DCB) and/or one or more additional buffers implemented by decoder. Prediction process may include, for example, inter picture prediction including motion compensation.

Still referring to FIG. 2, some implementations of block-based rescaling may enable flexibility in applying optimal filters for each block, instead of applying same filter for a whole frame. In some implementations, a skip-rescaling mode may be possible such that some blocks (based for example on the uniformity of the pixels and bitrate cost) can be in a skip-rescaling mode (such that rescaling would not change the bitrate). Skip-rescaling mode may be signaled in a bitstream; for instance, and without limitation, skip-rescaling mode may be signaled in a PPS parameter. Alternatively or additionally, decoder may determine that skip-rescaling mode is active based on one or more parameters set by decoder and/or signaled in bitstream.

Still referring to FIG. 2, rescaling may include up-sampling or otherwise using spatial filters. Spatial filters used in rescaling may include, without limitation, bicubic spatial filters that apply bicubic interpolation, bilinear spatial filters that apply bi-linear interpretation, Lanczos filters that use Lanczos filtering and/or Lanczos resampling using combinations of sinc filters, sinc-function interpolation and/or signal reconstruction techniques, or the like; persons skilled in the art, upon reviewing the entirety of this disclosure, will be aware of various filters that may be used for interpolation consistently with this disclosure. Interpolation filters may include, as a non-limiting example, any filters described above, a low-pass filter, which may be used, without limitation, by way of an up-sampling process whereby pixels between pixels of block and/or frame previous to scaling may be initialized to zero, and then populated with an output of the low-pass filter. Alternatively or additionally, any luma sample interpolation filtering process may be used. Luma sample interpretation may include computation of an interpolated value at a half-sample interpolation filter index, falling between two consecutive sample values of a non-scaled sample array. Computation of interpolated value may be performed, without limitation, by retrieval of coefficients and/or weights from lookup tables; selection of lookup tables may be performed as a function of motion models of coding units and/or scaling ratio amounts, for instance as determined using scaling constants as described above. Computation may include, without limitation, performing weighted sums of adjacent pixel values, where weights are retrieved from lookup tables. Computed values may alternatively or additionally be shifted; for instance and without limitation, values may be shifted by Min(4, BitDepth−8), 6, Max(2, 14−BitDepth), or the like. Persons skilled in the art, upon reviewing the entirety of this disclosure, will be aware of various alternative or additional implementations that may be used for interpolation filters.

Figure 3:
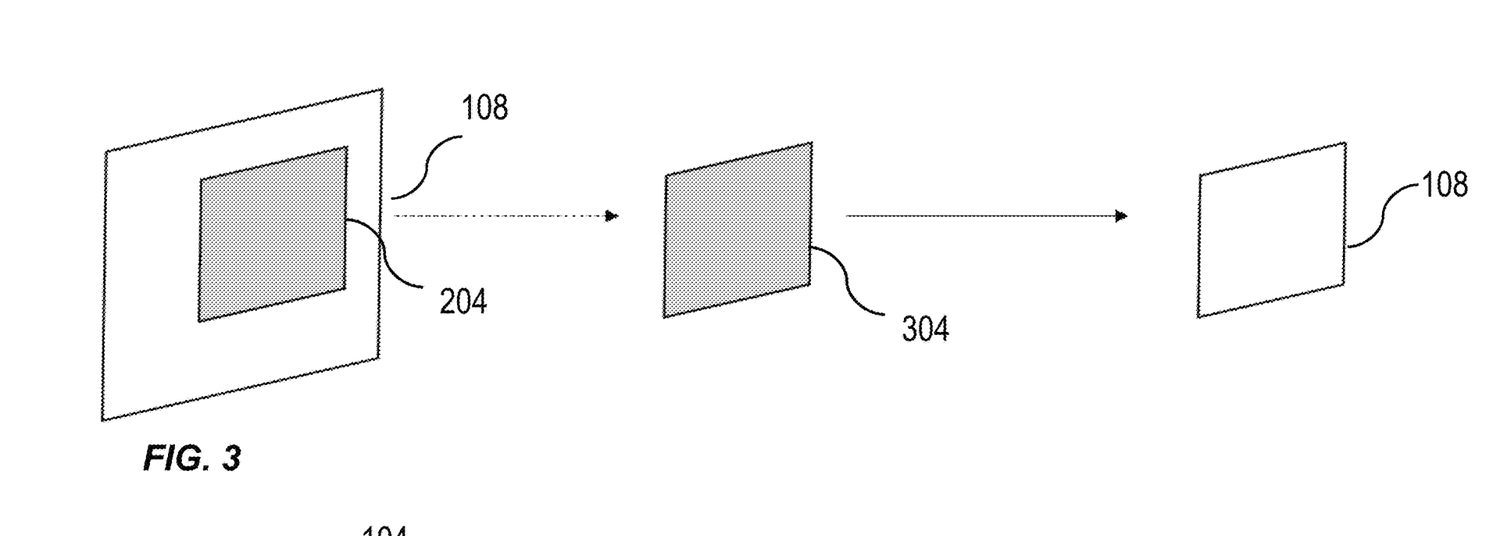
FIG. 3 is an illustration of an exemplary embodiment of an independent reference region and a predicted frame.

Referring now to FIG. 3, predicted picture 108 may have an identical or similar resolution and/or size to an extracted independent reference region 304. This approach may be used to downscale video resolution, thus reducing bitrate, to focus on a region of interest to a viewer, and/or to focus on a region identified by automated or user-facilitated detection as containing visual data of greater relevance to some purpose and/or task; alternatively or additionally, this approach may permit display of video to continue where network speeds are compromised. Advantages accruing to this approach may include saving bandwidth used for video transmission, saving resources used for video encoding, and/or saving time needed to decode and play the video. A result may be a superior user experience as well as a more efficient use of resources in devices and/or networks implementing disclosed embodiments.

Still referring to FIG. 3, predicted picture 108 may subsequently be rescaled to a smaller or larger picture. Width and height of the smaller and larger pictures may be obtained by multiplying W and H by an arbitrary rescaling constant (Rc) (also referred to as a scaling factor). In the case of smaller pictures, as a non-limiting example, Rc may have a value between 0 and 1. In the case of larger frames, and as a further non-limiting example, Rc can have values between 1 and 4. Other values are possible. Rescaling operation may be left as an option for an end user and/or a further program and/or module operating on a computing device displaying video to an end user, which in one example could rescale picture to fit the display resolution.

Figure 4:
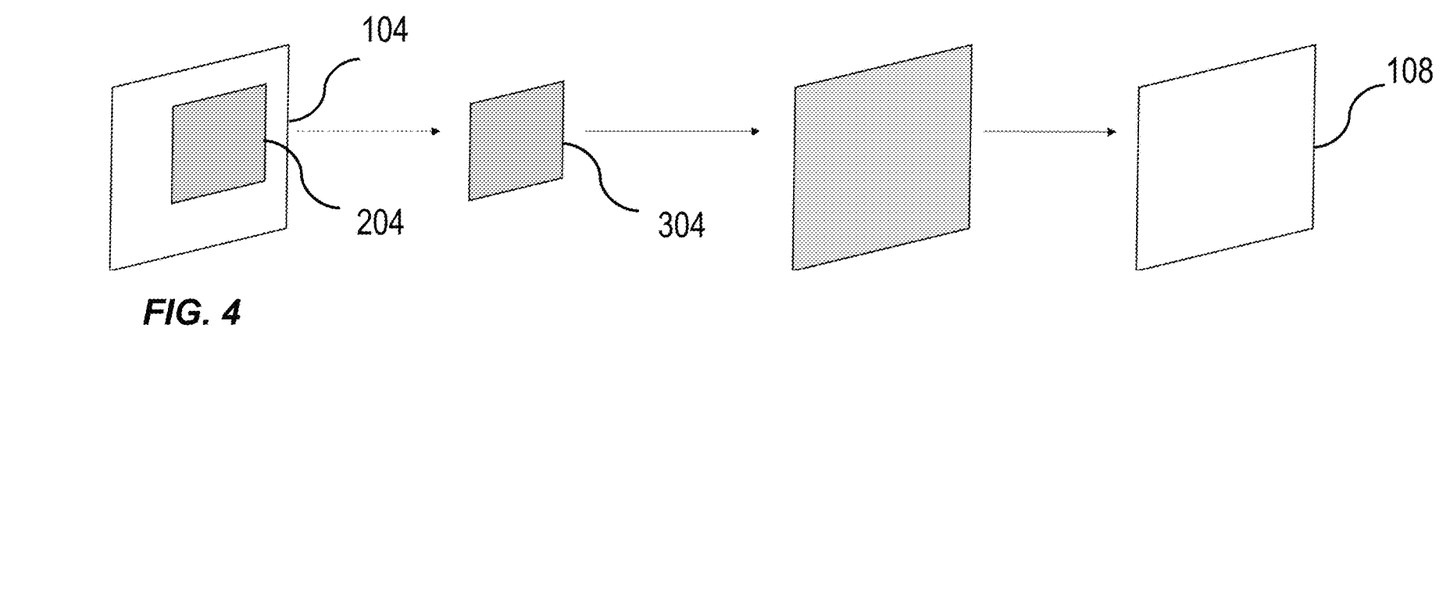
FIG. 4 is an illustration of an exemplary embodiment of an independent reference region and a predicted frame.

Referring now to FIG. 4, a decoder may rescale independent reference region 304, producing a rescaled region 404, for instance using a rescaling constant as described above, to match a full resolution of original video picture and/or a target resolution; for instance, W and H may each be multiplied by an Rc selected to scale W and H to the same size as D1 and D2 as described above, such as without limitation Rc=D1/W. Prediction and other operations may be performed to obtain predicted picture using rescaled sub-region.

Figure 5:
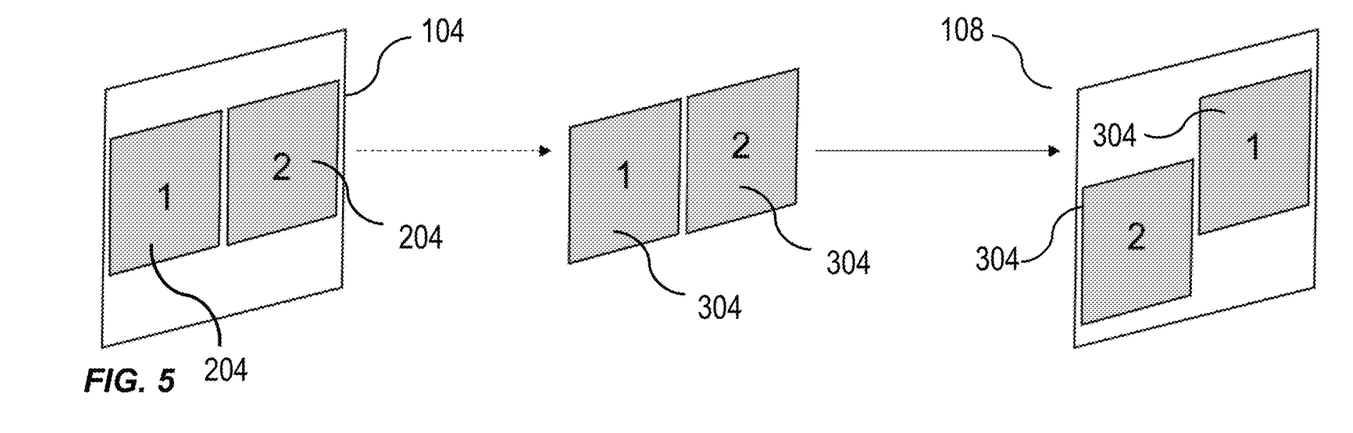
FIG. 5 is an illustration of an exemplary embodiment of independent reference regions and a predicted frame.

Referring now to FIG. 5, independent reference region 204 may be used to predict a portion of a picture rather than an entire picture. For instance, and without limitation, a picture such as a 360-video picture and/or a video picture used in virtual reality may extend beyond a field of vision of a user; in such a situation, a given frame of a video picture may be rendered with an independent reference region 204 corresponding to a predicted and/or detected current field of vision of a user. In other embodiments, independent reference region may correspond to an important, high-detail, and/or high-motion portion of first frame. Remainder of frame predicted may be generated using any other suitable prediction and/or decoding method; pixels may not be encoded, may be encoded in a default color such as without limitation black, and/or may be given chroma and/or luma values of neighboring pixels, for instance extending chroma and luma values from edges of independent reference region to fill screen. Portions may alternatively or additionally predicted from other parts of reference frame, residual, motion vectors, or the like.

Still referring to FIG. 5, a decoder may decode all or part of a second frame by transforming a first independent reference region 204, here denoted for exemplary purposes as "1". Transforming first independent reference region 204 may include scaling the first independent reference region 204, for instance as described above. Alternatively or additionally, transforming the first independent reference region 204 may include moving first independent reference region 204 relative to a location in a video picture; location in video picture may include edges and/or any coordinates in video picture. As a non-limiting example, and as illustrated for exemplary purposes in FIG. 5, a first independent reference region 204 may be displaced from an original location in a video picture coordinate system and/or relative to edges and/or pixel count to a novel location, for instance using a linear transformation such as an affine transformation, where an "affine motion transformation" as used in this disclosure is a transformation such as a matrix and/or vector describing a uniform displacement of a set of pixels or points represented in a video picture and/or picture, such as a set of pixels illustrating an object moving across a view in a video without changing apparent shape during motion. Any transformation, including any transformation describable using a matrix or other mathematical descriptor may be used consistently with this disclosure to move or otherwise transform first independent reference region. For instance and without limitation, transforming first independent reference region may include rotating the first independent reference region relative to a location in a video picture, flipping the first independent reference region, or the like.

Still referring to FIG. 5, decoding may include use of a second independent reference region 204, here denoted for exemplary purposes as "2". In an embodiment, decoder may locate a second independent reference region 204 in first frame, which may be performed in any way described above for first independent reference region 204. Alternatively or additionally, second independent reference region 204 may be extracted from another reference frame and/or retrieved from a buffer, such as a reference buffer and/or an LTR buffer, as described in further detail below. Decoding from second independent reference region 204 may be performed using any methods and/or method steps as described above for first independent reference region. Combination of first independent reference region 204 and second independent reference region 204 may be used in various ways; for instance, first independent reference region 204 may depict a first field of vision to a user of a picture having a size beyond the user's field of vision, while a second independent reference region 204 may depict another field of vision, which may be contiguous. Additional independent reference regions 204 may also be used to provide further portions of decoded frame; a plurality of independent reference regions may be extracted and/or retrieved to decode a picture, and may be contiguous, connected by pixels predicted using any method described above, or otherwise combined. Plurality of independent reference regions 204 may alternatively or additionally be used sequentially for a sequence of frames.

Figure 6:
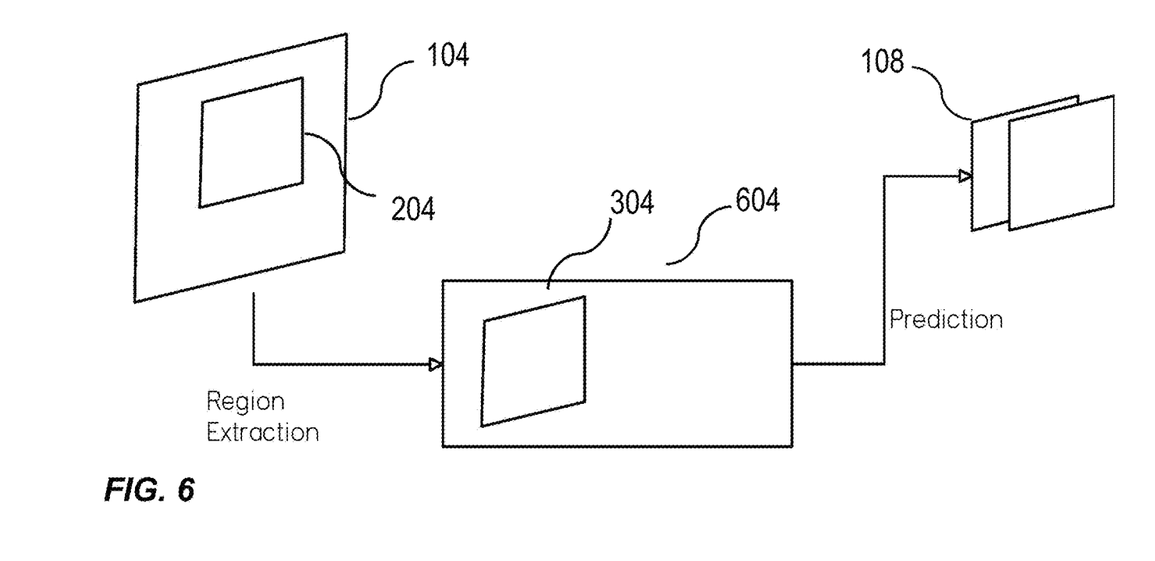
FIG. 6 is an illustration of an exemplary embodiment of an LTR buffer.

Referring now to FIG. 6, one or more independent reference regions 204 may be stored in a buffer, such as a reference buffer and/or in an LTR buffer 604. LTR buffer 604 may include a plurality of frames. In an embodiment, an LTR buffer 604 may contain a plurality of frames and/or independent reference regions 204; each of plurality of frames and/or independent reference regions may have a corresponding index permitting retrieval and/or signaling for retrieval, for instance as described in further detail below. Reference buffer and/or LTR buffer 604 may be periodically updated and/or modified, for instance by addition and/or removal of frames and/or independent reference regions.

Still referring to FIG. 6, use of independent reference regions 204 and/or reference frames 104 may be signaled in bitstream, for instance by an encoder. For example, and without limitation, use of independent reference regions, presence of independent reference regions in a picture may signaled by the encoder in the header of the video sequence for instance in a sequence parameter set or the like. A single flag may be used to indicate presence of independent regions; absence of the flag may be interpreted as a lack of any independent regions. A total number of independent regions may also be signaled in a sequence header. Geometric characteristics of independent reference regions, identifiers of independence reference regions, for instance for retrieval from buffers as described above, may also be signaled in sequence headers. Alternatively or additionally, one or more signals may be provided in picture headers, such as in the picture parameter set. In an embodiment signaling in a picture header may extend flexibility of a decoder, allowing decisions on a picture level. A list of region IDs may include a sequence of consecutive numbers that represent region IDs in a prescribed order. Decoder may use a signaled list to reposition and recompose independent regions and picture regions predicted from the independent regions.

Figure 7:
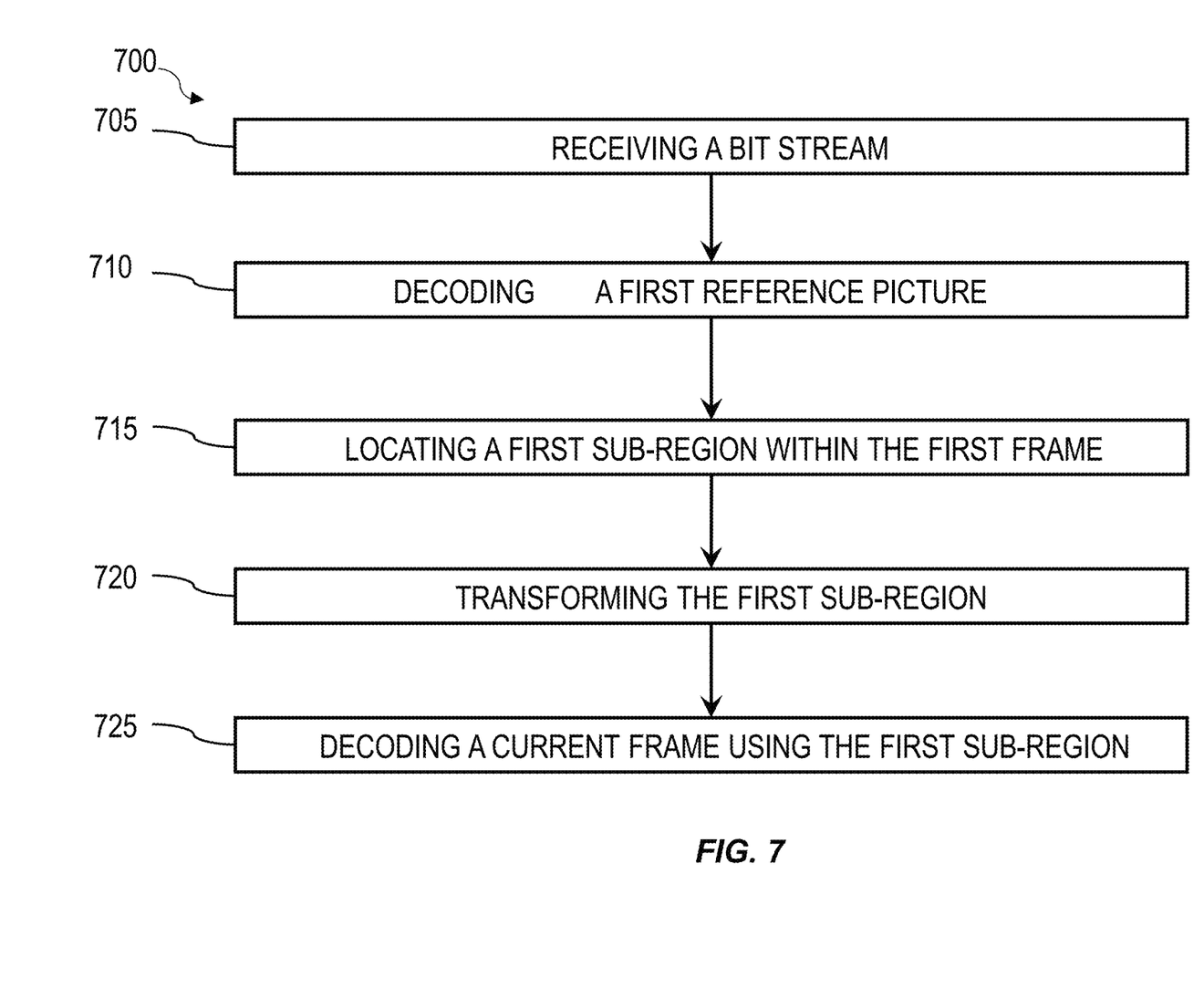
FIG. 7 is a process flow diagram illustrating an example process of decoding a video according to some implementations of the current subject matter

Referring now to FIG. 7, an exemplary embodiment of a method 700 of video coding using reference regions is illustrated. At step 705, a decoder receives a bitstream, for instance as described in further detail below. Bitstream may include a coded video bitstream. Bitstream may include at least one coded reference picture and/or LTR frame, which may alternatively be referred to as a "reference picture" and/or an "LTR picture," and at least one coded current picture. Coded current picture may have a first size, which may include any size as described above, including an area. At step 710, decoder decodes the reference picture and/or LTR frame; this may be performed according to any process for decoding as described in this disclosure. Decoder may identify reference frame and/or LTR frame in bitstream. Alternatively reference frame and/or LTR frame may not be decoded, and only independent reference regions may be decoded.

At step 715, and still referring to FIG. 7, decoder locates a first sub-region within reference frame and/or LTR frame; this may be accomplished, without limitation, as described above in reference to FIGS. 1-6. For instance, and without limitation, locating first sub-region may include identifying, in bitstream, a geometric characterization of an independent reference region within reference frame and/or LTR frame; bitstream may be signaled by an encoder as described above. As a non-limiting example, first sub-region may be rectangular, and geometric characterization may include a quadruple of numbers characterizing vertices of the first sub-region. As a further non-limiting example, geometric characterization may include and/or sub-region 204 may be characterized by a height offset, a height, a length offset and a length. First sub-region have a second size; second size may be different from first size, or in other words may either be larger or smaller than first size. Identifying the first sub-region may include receiving, in the bitstream, an indication that the first sub-region is present. In an embodiment, traditional prediction using reference frames may still be supported, by either signaling that there are zero regions within picture or defining one region that has same size as the original picture. Flexibility may be provided by allowing specification of one or more regions that are extracted and as such considered as an independent reference picture for future prediction.

Continuing to refer to FIG. 7, at step 720, decoder transforms first sub-region 204. Transformation may produce a second and/or rescaled reference picture and/or a part thereof. Transforming first sub-region may include any transformation and/or modification to any sub-region as described in this disclosure. Transforming first sub-region may include, without limitation, translating the first sub-region. As a further example, decoder may be configured to transform first sub-region by applying an affine transformation, which may include any affine transformation as described above. As an additional non-limiting example, decoder may rescale first sub-region to a third size the third size may be equal to first size, to form a rescaled reference picture. In other words, decoder may rescale sub-region to match a current and/or signaled size of current frame. Alternatively or additionally, first sub-region may be left at a current size of first sub-region; decoder may not transform first sub-region. Decoder may extract first sub-region from reference frame and/or LTR frame; this may be performed, without limitation, as described above in reference to FIGS. 1-6. At step 725, decoder decodes current frame using the first sub-region as a reference for the current frame; this may be implemented, without limitation, as described above in reference to FIGS. 1-6. For instance, decoding current frame may include decoding the current frame having the same size as first sub-region. Decoding the second frame may include transforming the first sub-region. Transforming the first sub-region may include scaling the first sub-region, flipping the first sub-region, moving the first sub-region relative to a location in a video picture, and/or rotating the first sub-region relative to a location in a video picture.

Still referring to FIG. 7, decoder may store reference frame and/or LTR frame in a buffer; buffer may include a long-term reference buffer and/or a reference picture buffer. Decoder may be further configured to locate a second sub-region in the reference frame and/or LTR frame. Decoder may decode a second current frame using first sub-region and/or the second sub-region. Decoder may store the second independent reference region in a buffer. Decoder may decode a second current frame using first sub-region and/or a second sub-region and/or reference frame, which may be retrieved from a buffer, extracted from another frame, or the like.

Figure 8:
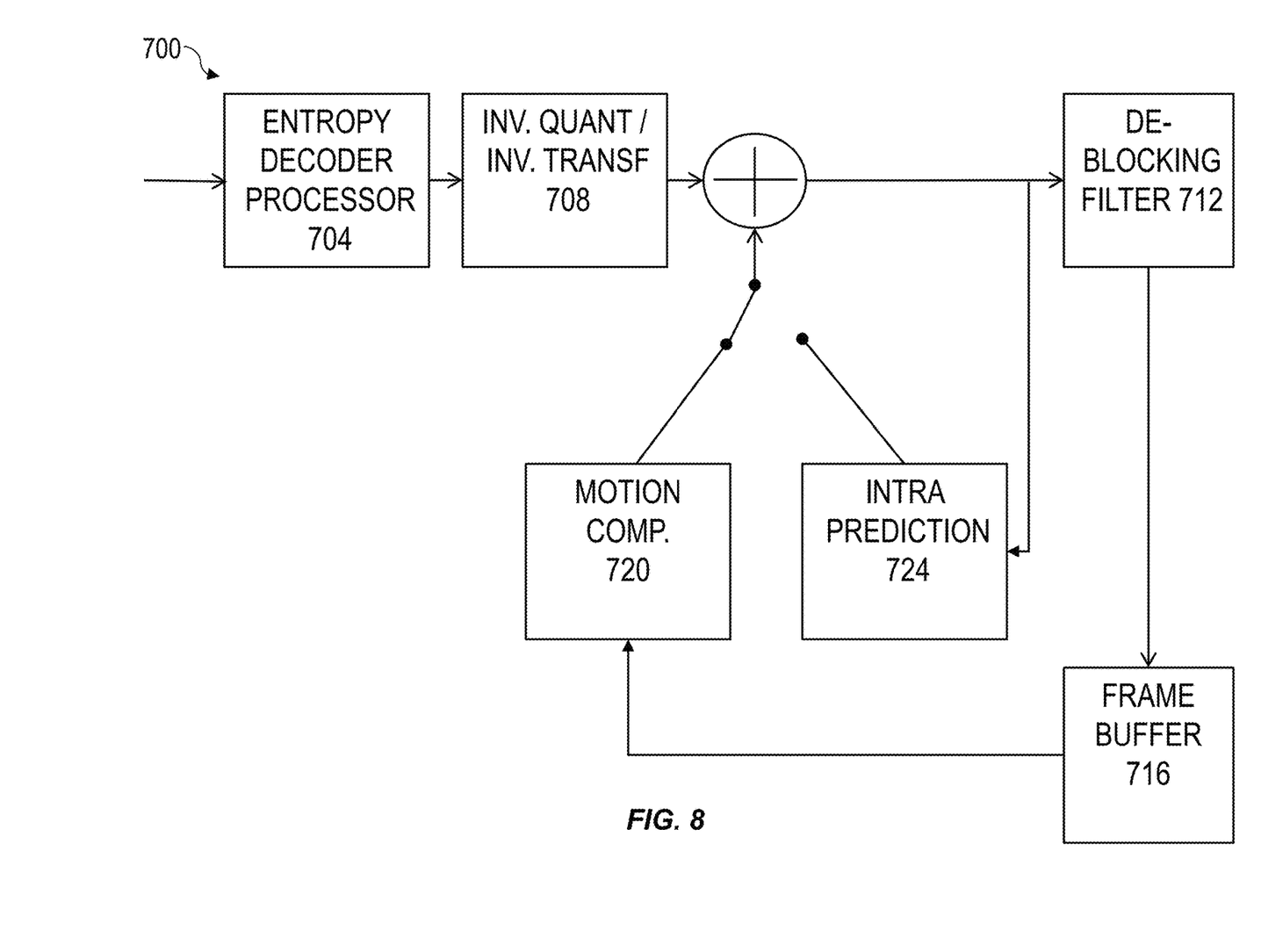
FIG. 8 is a system block diagram illustrating an example decoder capable of decoding a bit stream according to some implementations of the current subject matter.

FIG. 8 is a system block diagram illustrating an example decoder 800 capable of decoding a bitstream including by constructing a motion vector candidate list using a global motion vector candidate utilized by an adjacent block. Decoder 800 may include an entropy decoder processor 804, an inverse quantization and inverse transformation processor 808, a deblocking filter 812, a frame buffer 816, a motion compensation processor 820 and/or an intra prediction processor 824.

In operation, and still referring to FIG. 8, bit stream 828 may be received by decoder 800 and input to entropy decoder processor 804, which may entropy decode portions of bit stream into quantized coefficients. Quantized coefficients may be provided to inverse quantization and inverse transformation processor 808, which may perform inverse quantization and inverse transformation to create a residual signal, which may be added to an output of motion compensation processor 820 or intra prediction processor 824 according to a processing mode. An output of the motion compensation processor 820 and intra prediction processor 824 may include a block prediction based on a previously decoded block. A sum of prediction and residual may be processed by deblocking filter 812 and stored in a frame buffer 816.

In an embodiment, and still referring to FIG. 8 decoder 800 may include circuitry configured to implement any operations as described above in any embodiment as described above, in any order and with any degree of repetition. For instance, decoder 800 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Decoder may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 8, decoder 800 and/or circuitry thereof may be designed and/or configured to perform any method, method step, or sequence of method steps in any embodiment described in this disclosure, in any order and with any degree of repetition. For instance, decoder 800 and/or circuitry thereof may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. decoder 800 and/or circuitry thereof may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 9:
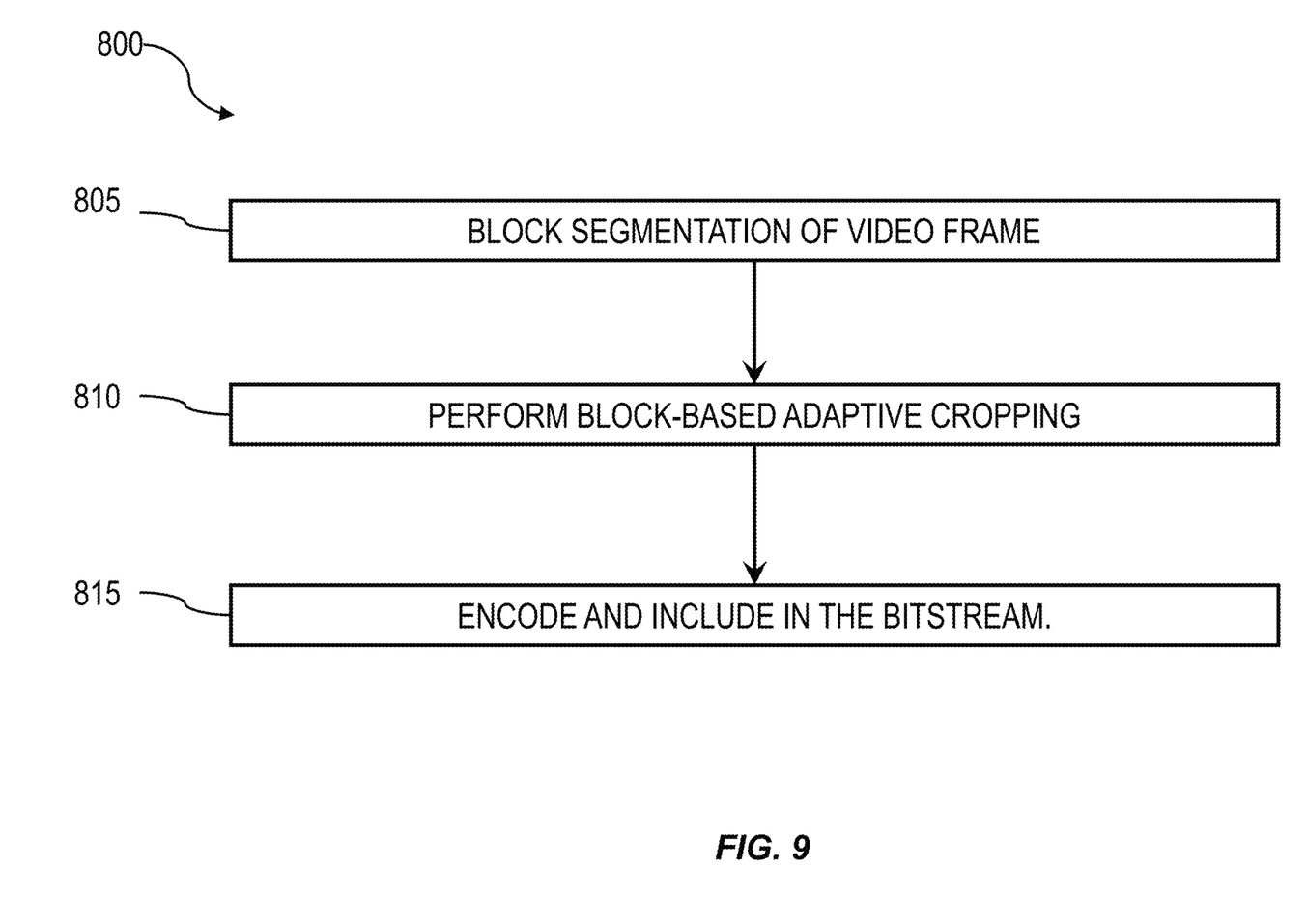
FIG. 9 is a process flow diagram illustrating an example process of encoding a video according to some implementations of the current subject matter.

FIG. 9 is a process flow diagram illustrating an example process 900 of encoding a video with adaptive cropping that can enable additional flexibility for the video encoder/decoder allowing bitrate savings in various use cases. At step 905, a video frame may undergo initial block segmentation, for example, using a tree-structured macro block partitioning scheme that can include partitioning a picture frame into CTUs and CUs.

At step 910, and still referring to FIG. 9 identification of a first reference region may be performed, including selection of a sub-region of a frame or portion thereof. Region may be selected by the means of automatic or expert input. Automatic selection may be achieved, as a non-limiting example, by a computer vision algorithm that detecting certain objects; object detection may include further processing such as object classification or the like. Expert input selection may be achieved, without limitation, using human manual intervention, for example selecting a close-up of a person and/or object of interest in a video, such as a person in a surveillance video. Another possible use case may be to select a maximally salient region that contributes the most to a bit rate reduction. Adaptive cropping may further include selection of a geometric characterization of sub-region; for instance, and without limitation, selection of geometric characterization of sub-region may include selection of a quadruple as described above, such as without limitation (X,Y,W,H). Selection of geometric characterization of sub-region may include updating information and/or information indicating changes to data defining sub-region from one frame to another as described above with regard to dynamic data defining sub-region.

Still referring to FIG. 9, at step 915, block may be encoded and included in the bit stream. Encoding can include utilizing inter prediction and intra prediction modes, for example. Encoding may include adding bits to the bitstream characterizing (X,Y,W,H), identifying adaptive cropping mode, or the like, for instance as described above. Encoding may include encoding updating information and/or information indicating changes to data defining sub-region from one frame to another as described above with regard to dynamic data defining sub-region.

Figure 10:
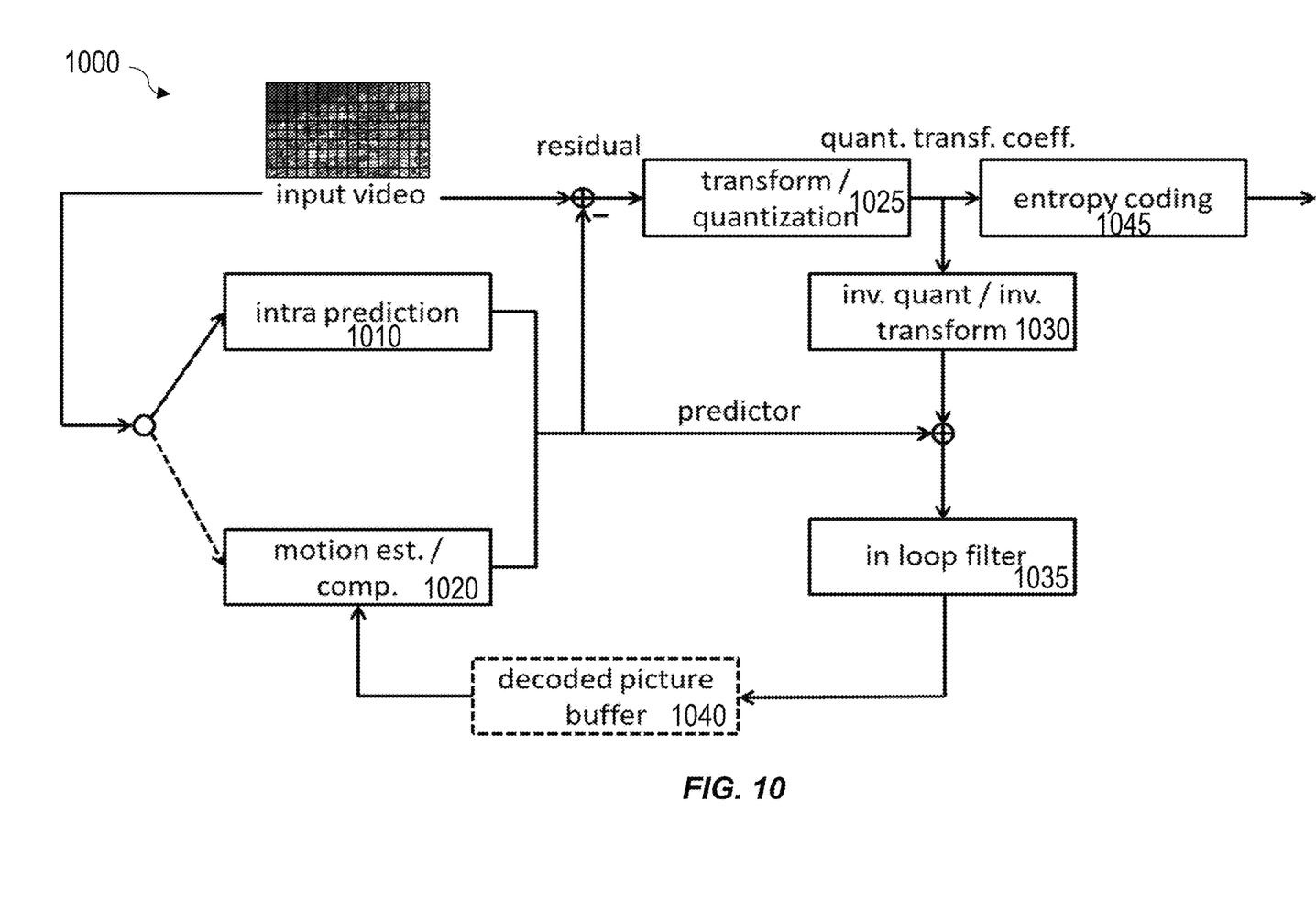
FIG. 10 is a system block diagram illustrating an example video encoder according to some implementations of the current subject matter.

FIG. 10 is a system block diagram illustrating an example video encoder 1000 capable of adaptive cropping that can enable additional flexibility for the video encoder/decoder allowing bitrate savings in various use cases. The example video encoder 1000 receives an input video 1005, which can be initially segmented or dividing according to a processing scheme, such as a tree-structured macro block partitioning scheme (e.g., quad-tree plus binary tree). An example of a tree-structured macro block partitioning scheme can include partitioning a picture frame into large block elements called coding tree units (CTU). In some implementations, each CTU can be further partitioned one or more times into a number of sub-blocks called coding units (CU). The final result of this portioning can include a group of sub-blocks that can be called predictive units (PU). Transform units (TU) can also be utilized.

Still referring to FIG. 10, example video encoder 1000 includes an intra prediction processor 1015, a motion esti-mation/compensation processor 1020 (also referred to as an inter-prediction processor) capable of supporting adaptive cropping, a transform/quantization processor 1025, an inverse quantization/inverse transform processor 1030, an in-loop filter 1035, a decoded picture buffer 1040, and an entropy coding processor 1045. Bit stream parameters can be input to the entropy coding processor 1045 for inclusion in the output bit stream 1050.

In operation, and continuing to refer to FIG. 10, for each block of a frame of the input video 1005, whether to process the block via intra picture prediction or using motion estimation/compensation can be determined. The block can be provided to the intra prediction processor 1010 or the motion estimation/compensation processor 1020. If the block is to be processed via intra prediction, the intra prediction processor 1010 can perform the processing to output the predictor. If the block is to be processed via motion estimation/compensation, the motion estimation/compensation processor 1020 can perform the processing including using adaptive cropping, if applicable.

Still referring to FIG. 10, residual can be formed by subtracting the predictor from the input video. The residual can be received by the transform/quantization processor 1025, which can perform transformation processing (e.g., discrete cosine transform (DCT)) to produce coefficients, which can be quantized. The quantized coefficients and any associated signaling information can be provided to the entropy coding processor 1045 for entropy encoding and inclusion in the output bit stream 1050. The entropy encoding processor 1045 can support encoding of signaling information related to encoding the current block. In addition, the quantized coefficients can be provided to the inverse quantization/inverse transformation processor 1030, which can reproduce pixels, which can be combined with the predictor and processed by the in-loop filter 1035, the output of which is stored in the decoded picture buffer 1040 for use by the motion estimation/compensation processor 1020 that is capable of adaptive cropping.

With continued reference to FIG. 10, although a few variations have been described in detail above, other modifications or additions are possible. For example, in some implementations, current blocks can include any symmetric blocks (8×8, 16×16, 32×32, 64×64, 128×128, and the like) as well as any asymmetric block (8×4, 16×8, and the like).

Still referring to FIG. 10, in some implementations, a quadtree plus binary decision tree (QTBT) can be implemented. In QTBT, at the Coding Tree Unit level, the partition parameters of QTBT are dynamically derived to adapt to the local characteristics without transmitting any overhead. Subsequently, at the Coding Unit level, a joint-classifier decision tree structure can eliminate unnecessary iterations and control the risk of false prediction. In some implementations, LTR frame block update mode can be available as an additional option available at every leaf node of the QTBT.

In some implementations, and with continued reference to FIG. 10, additional syntax elements can be signaled at different hierarchy levels of the bit stream. For example, a flag can be enabled for an entire sequence by including an enable flag coded in a Sequence Parameter Set (SPS). Further, a CTU flag can be coded at the coding tree unit (CTU) level.

Still referring to FIG. 10, encoder 1000 may include circuitry configured to implement any operations as described above in reference to FIG. 8 or 10 in any embodiment, in any order and with any degree of repetition. For instance, encoder 1000 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Encoder 1000 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 10, non-transitory computer program products (i.e., physically embodied computer program products) may store instructions, which when executed by one or more data processors of one or more computing systems, causes at least one data processor to perform operations, and/or steps thereof described in this disclosure, including without limitation any operations described above and/or any operations decoder 700 and/or encoder 1000 may be configured to perform. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, or the like.

With continued reference to FIG. 10, encoder 1000 and/or circuitry thereof may be designed and/or configured to perform any method, method step, or sequence of method steps in any embodiment described in this disclosure, in any order and with any degree of repetition. For instance, encoder 1000 and/or circuitry thereof may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. encoder 1000 and/or circuitry thereof may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
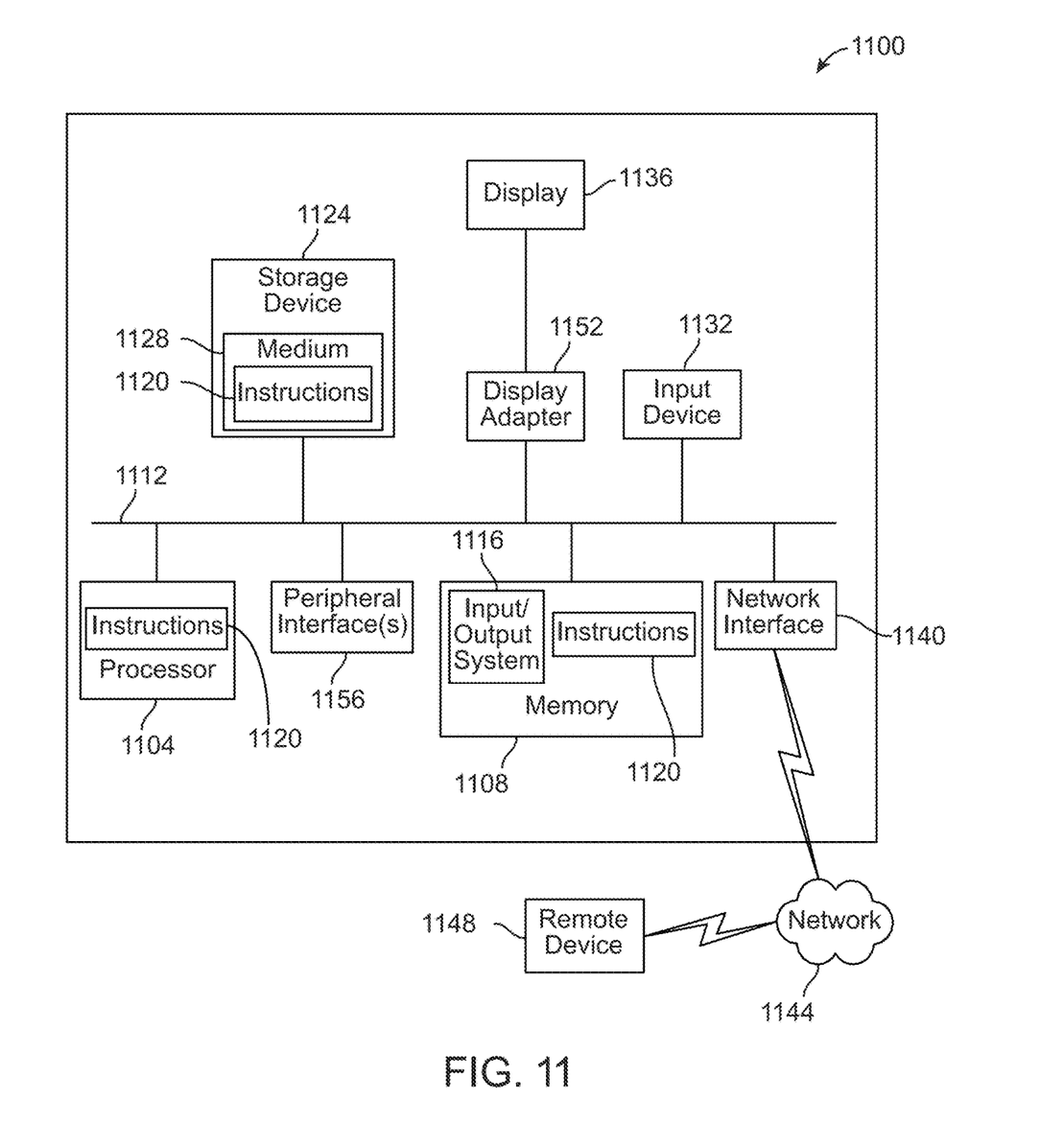
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A decoder, the decoder configured to:
   receive a bitstream including a signaling information, and a first coded picture, at least a portion of the signaling information being associated with the first coded picture;
   detect in the signaling information associated with the first coded picture, that an independent sub-picture is present in the first coded picture and a location of the coded sub-picture in the first coded picture;
   extract from the first coded picture, and decode, the coded sub-picture to form a rectangular reference picture having a first resolution;
   determine a predictor in the reference picture using a scaling constant obtained from information in the bitstream; and
   use the predictor to decode a subsequent picture having a second resolution.

2. The decoder of claim 1, wherein the predictor is formed using an interpolation filter.

3. The decoder of claim 1, wherein the predictor is determined using a motion vector candidate list.

4. The decoder of claim 1, wherein the first predictor is used to decode a first subsequent picture.

5. The decoder of claim 4, further configured to determine a second predictor in the second reference picture using a second scaling constant determined from information in the bitstream.

6. The decoder of claim 5, wherein the second predictor is used to decode a second subsequent picture.

7. The decoder of claim 6, wherein the first and second subsequent pictures are sub-pictures extracted from the same picture.

8. The decoder of claim 1, wherein the first resolution is larger than the second resolution.

9. The decoder of claim 1, wherein the first resolution is smaller than the second resolution.

10. The decoder of claim 1, wherein the first resolution is the same as the second resolution.

11. An encoder for encoding a bitstream to be decoded by a compliant decoder, the bitstream comprising a sequence parameter set, a first coded picture, and a subsequent coded picture, the decoder being configured to:
    receive the bitstream;
    detect in the sequence parameter set associated with the first coded picture, that an independent sub-picture is present in the first coded picture and a location of the coded sub-picture in the first coded picture;
    extract from the first coded picture, and decode, the coded sub-picture to form a reference picture;
    determine a predictor in the reference picture using a scaling constant obtained from information in the bitstream, the information including an index; and
    use the predictor to decode a subsequent picture.

* * * * *